(12) United States Patent
Yang et al.

(10) Patent No.: US 11,659,500 B2
(45) Date of Patent: May 23, 2023

(54) RESOURCE ALLOCATION AND POWER CONTROL FOR SIDELINK DISCOVERY

(71) Applicant: QUALCOMM Incorporated, San Diego, CA (US)

(72) Inventors: Wei Yang, San Diego, CA (US); Seyedkianoush Hosseini, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/444,978

(22) Filed: Aug. 12, 2021

(65) Prior Publication Data

US 2022/0095246 A1    Mar. 24, 2022

Related U.S. Application Data

(60) Provisional application No. 63/083,062, filed on Sep. 24, 2020.

(51) Int. Cl.
| | |
|---|---|
| *H04W 52/10* | (2009.01) |
| *H04W 52/38* | (2009.01) |
| *H04W 48/16* | (2009.01) |
| *H04W 52/24* | (2009.01) |
| *H04L 5/00* | (2006.01) |

(52) U.S. Cl.
CPC ......... *H04W 52/383* (2013.01); *H04L 5/0048* (2013.01); *H04W 48/16* (2013.01); *H04W 52/10* (2013.01); *H04W 52/242* (2013.01)

(58) Field of Classification Search
CPC . H04W 52/383; H04W 52/242; H04W 52/10; H04W 48/16; H04L 5/0048
See application file for complete search history.

(56) References Cited

U.S. PATENT DOCUMENTS

| | | | |
|---|---|---|---|
| 11,172,525 B2* | 11/2021 | Ryu | H04W 8/005 |
| 2019/0268904 A1* | 8/2019 | Miao | H04W 52/02 |
| 2020/0052843 A1* | 2/2020 | Cheng | H04W 72/20 |

(Continued)

FOREIGN PATENT DOCUMENTS

| | | | | |
|---|---|---|---|---|
| WO | 2020/096693 A1 | 5/2020 | | |
| WO | WO-2020096693 A1 * | 5/2020 | .......... | H04W 52/242 |

OTHER PUBLICATIONS

International Search Report and Written Opinion from corresponding PCT Application No. PCT/US2021/046000.

(Continued)

*Primary Examiner* — Hai V Nguyen
(74) *Attorney, Agent, or Firm* — Arent Fox, LLP

(57) ABSTRACT

The present disclosure describes control of user equipment (UE) transmission power level in sidelink discovery and/or communications processes. In order to reduce interference with base station and/or other UE transmissions that occur geographically proximate to a UE, sidelink power transmission levels are controlled based on one or more factors. A method in accordance with an aspect of the present disclosure includes determining at least one transmission parameter at the first UE, determining a transmit power level based on the at least one transmission parameter, and transmitting a discovery message at the determined transmit power level on a sidelink channel.

29 Claims, 10 Drawing Sheets

(56) References Cited

U.S. PATENT DOCUMENTS

| | | | | |
|---|---|---|---|---|
| 2020/0120730 A1* | 4/2020 | Ryu | .................. | H04W 4/06 |
| 2020/0137814 A1* | 4/2020 | Ayaz | .................. | H04W 76/00 |
| 2020/0260386 A1* | 8/2020 | Ryu | .................. | H04W 52/247 |
| 2020/0275425 A1* | 8/2020 | Cao | .................. | H04L 5/0091 |
| 2021/0051594 A1* | 2/2021 | Chae | .................. | H04W 80/02 |
| 2021/0160844 A1* | 5/2021 | Lin | .................. | H04L 1/0072 |
| 2021/0337519 A1* | 10/2021 | Farag | .................. | H04W 72/20 |
| 2021/0385751 A1* | 12/2021 | Lee | .................. | H04W 52/10 |
| 2022/0217655 A1* | 7/2022 | Lee | .................. | H04W 52/325 |
| 2022/0224457 A1* | 7/2022 | Ebrahim Rezagah | .................. | H04L 1/1896 |
| 2022/0338232 A1* | 10/2022 | Cao | .................. | H04W 76/14 |
| 2022/0386276 A1* | 12/2022 | Lee | .................. | H04W 72/0473 |

OTHER PUBLICATIONS

"Generation Partnership Project; Technical Specification Group Radio Access Network; Evolved Universal Terrestrial Radio Access (E-UTRA); Physical layer procedures (Release 16)", 3GPP Standard; Technical Specification 3GPP TS 36.213, 3rd Generation Partnership Project (3GPP), Mobile Competence Centre; 650, Route Des Lucioles; F-06921 Sophia-Antipolis Cedex; France; vol. RAN WG1, No. V16.2.0 Jul. 14, 2020 (Jul. 14, 2020), pp. 496-557, XP051925044, Retrieved from the Internet: URL:ftp://ftp.3gpp.org/Specs/archive/36_series/36.213/36213-g20.zip 36213-g20_s14-xx.docx [retrieved on Jul. 14, 2020].

* cited by examiner

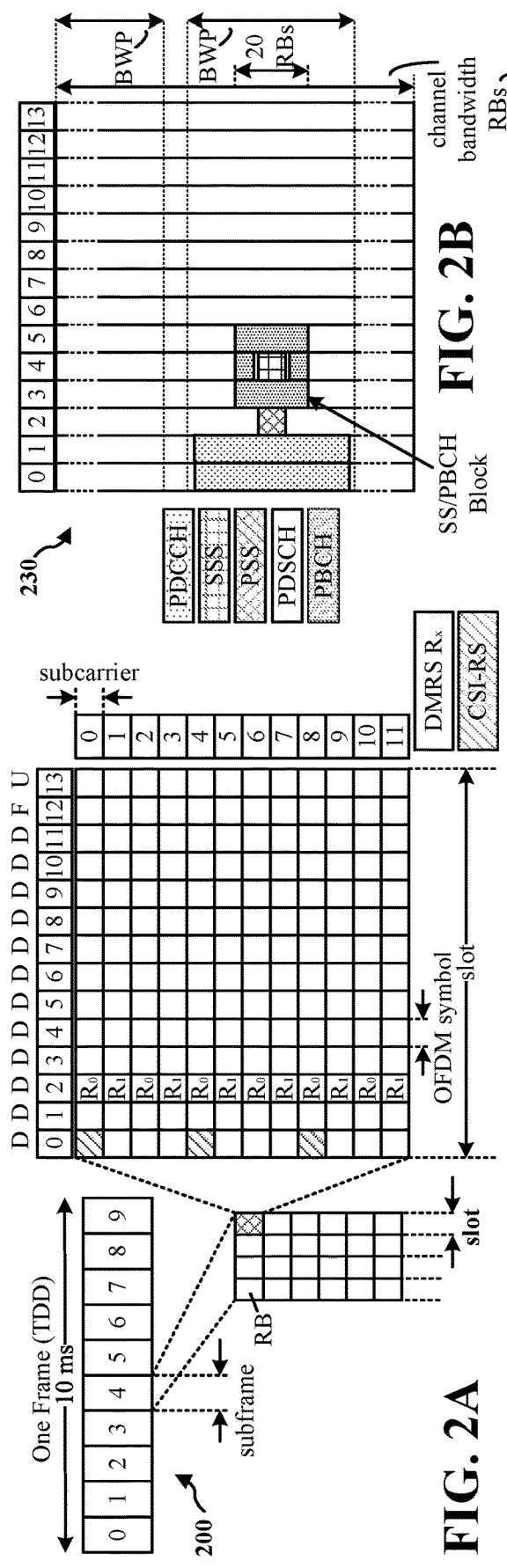
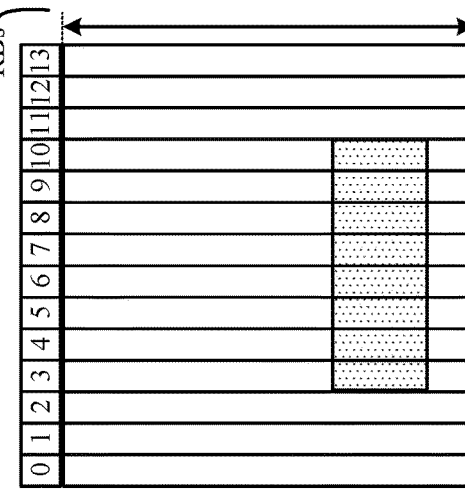
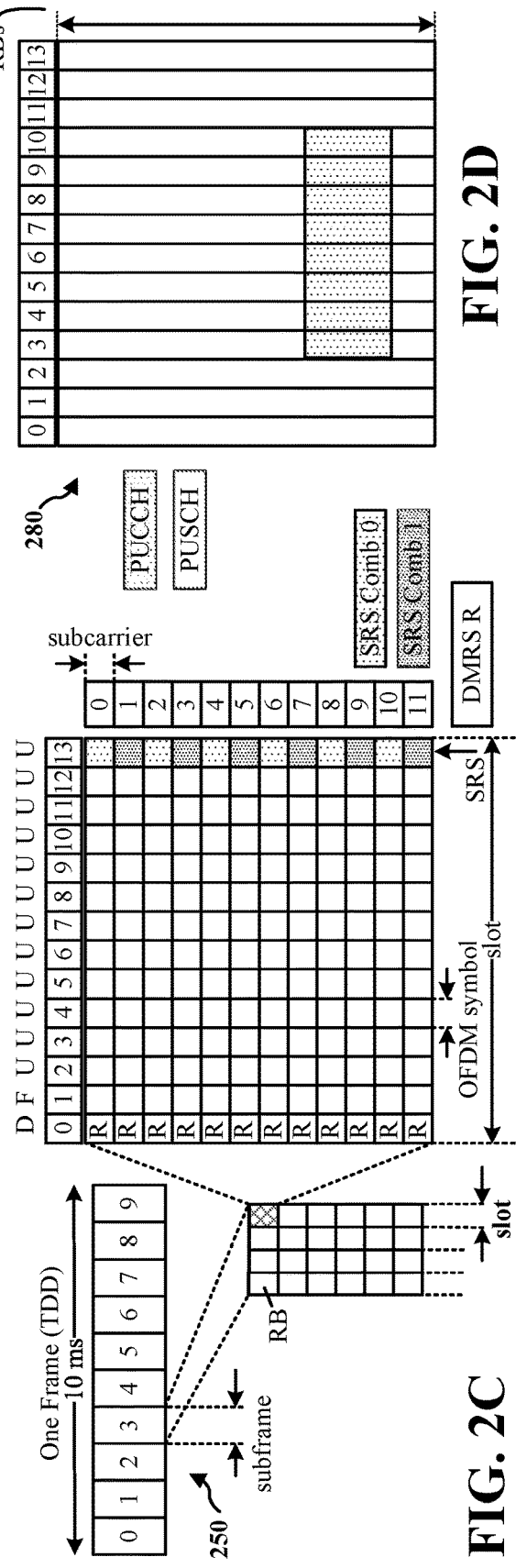
FIG. 2A
FIG. 2B
FIG. 2C
FIG. 2D

RESOURCE ALLOCATION AND POWER CONTROL FOR SIDELINK DISCOVERY

CROSS REFERENCE TO RELATED APPLICATION(S)

This application claims the benefit of U.S. Provisional Patent Application Ser. No. 63/083,062, entitled "METHOD AND APPARATUS FOR RESOURCE ALLOCATION AND POWER CONTROL FOR SIDELINK DISCOVERY" and filed on Sep. 24, 2020, which is expressly incorporated by reference herein in its entirety.

BACKGROUND

Technical Field

The present disclosure generally relates to communication systems, and more particularly, to methods and apparatuses for resource allocation and power control for sidelink (SL) discovery.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes control of user equipment (UE) transmission power level in sidelink discovery processes. In order to reduce interference with base station and/or other UE transmissions that occur geographically proximate to a UE, sidelink power transmissions are controlled based on one or more of downlink pathlosses, sidelink pathlosses, reference sidelink pathloss values, application usage, and/or other factors. UE transmission power levels may also be determined based on the type of message being transmitted. UE transmission levels may also be increased based on one or more factors, depending on the number of responses received, the time it takes to receive a response, and/or other factors.

In an aspect of the disclosure, a method, a computer-readable medium, and an apparatus are provided. A method in accordance with an aspect of the present disclosure comprises determining at least one transmission parameter associated with a discovery message at the first UE, determining a transmit power level based on the at least one transmission parameter; and transmitting the discovery message at the determined transmit power level on a sidelink channel.

A method in accordance with an aspect of the present disclosure comprises receiving a first discovery message from at least one second UE, determining at least one transmission parameter of the first discovery message, determining the transmit power level based on the at least one transmission parameter, and transmitting a second discovery message at the determined transmit power level on a SL discovery channel.

An apparatus in accordance with an aspect of the present disclosure comprises a memory and at least one processor coupled to the memory and configured to determine at least one transmission parameter associated with a discovery message at the first UE, determine a transmit power level based on the at least one transmission parameter, and transmit the discovery message at the determined transmit power level on a sidelink channel.

An apparatus in accordance with an aspect of the present disclosure comprises means for determining at least one transmission parameter associated with a discovery message at the first UE, means for determining a transmit power level based on the at least one transmission parameter, and means for transmitting the discovery message at the determined transmit power level on a sidelink (SL) channel.

A computer-readable medium in accordance with an aspect of the present disclosure stores computer executable code, the code when executed by a processor cause the processor to determine at least one transmission parameter associated with a discovery message at the first UE, determine a transmit power level based on the at least one transmission parameter, and transmit the discovery message at the determined transmit power level on a sidelink channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
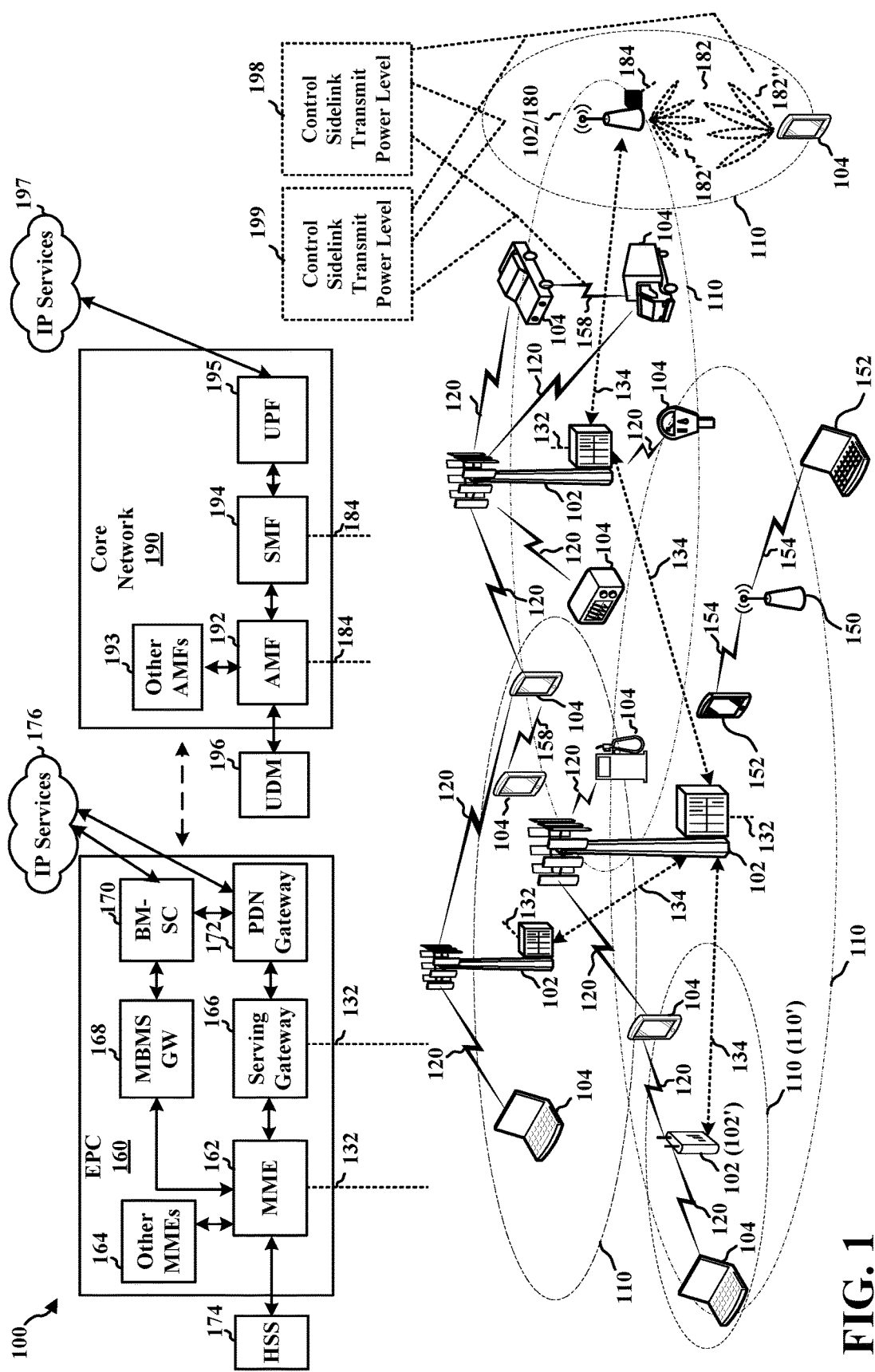
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, UE 104 may control sidelink transmit power levels during discovery of other UE 104 that are geographically proximate. For example, UE 104 may be configured to determine at least one transmission parameter at a first UE, determine a transmit power level based on the at least one transmission parameter, and transmit a discovery message at the determined transmit power level on a sidelink channel as shown in 198.

Referring again to FIG. 1, in certain aspects, UE 104 may control sidelink transmit power levels during discovery of other UE 104 that are geographically proximate. For example, UE 104 may be configured to receive a discovery message from at least one second UE, determine at least one transmission parameter, determine the transmit power level based on the at least one transmission parameter, and transmit a discovery message at the determined transmit power level on a SL channel as shown in 199.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
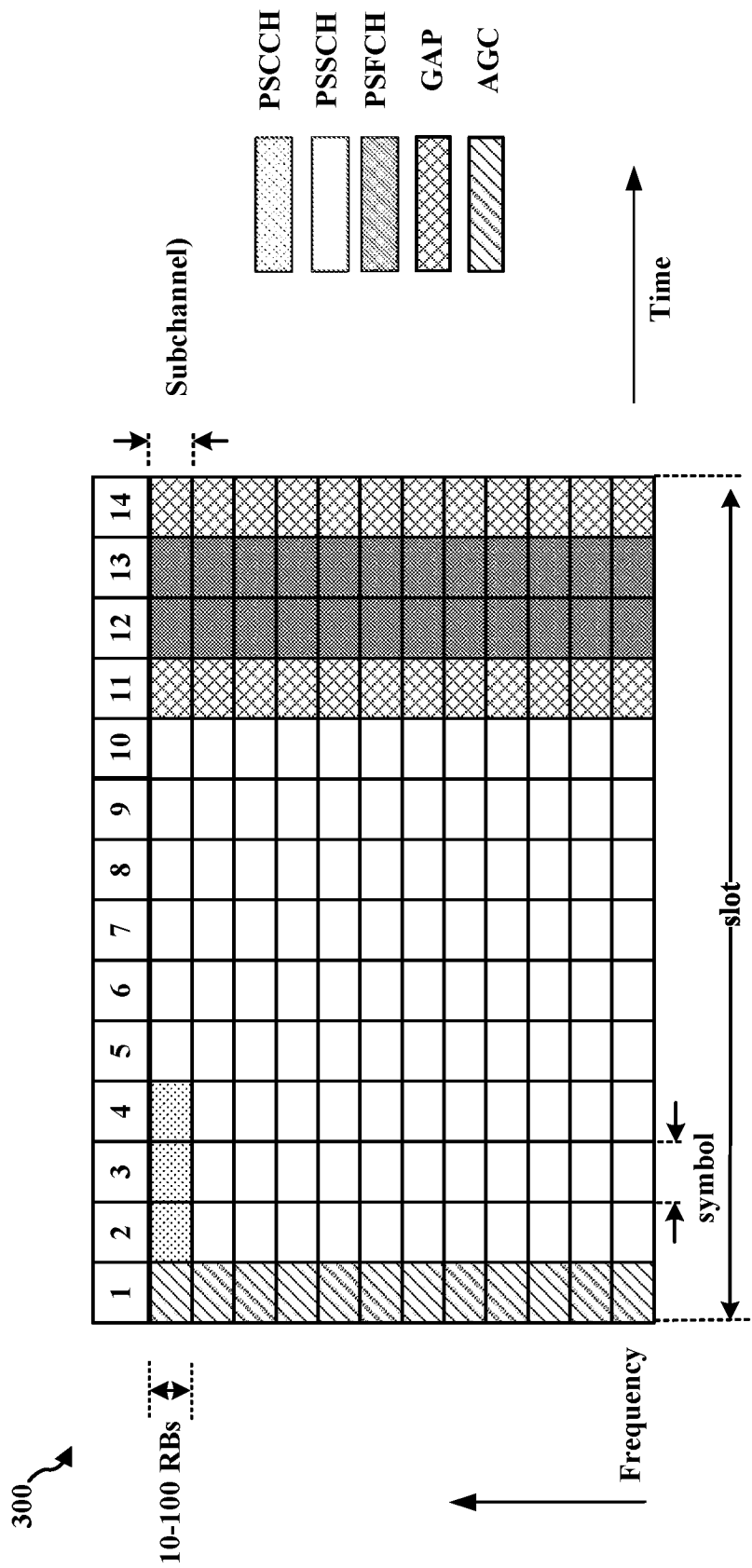
FIG. 3 illustrates example aspects of a sidelink slot structure.

FIG. 3 illustrates example diagram 300 illustrating non-limiting examples of time and frequency resources that may be used for wireless communication based on sidelink. In some examples, the time and frequency resources may be based on a slot structure. In other examples, a different structure may be used. The slot structure may be within a 5G/NR frame structure in some examples. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 3 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI).

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. Diagram 300 also illustrates multiple subchannels, where each subchannel may include multiple RBs. For example, one subchannel in sidelink communication may include 10-100 RBs. As illustrated in FIG. 3, the first symbol of a subframe may be a symbol for automatic gain control (AGC). Some of the REs may include control information, e.g., along with PSCCH and/or PSSCH. The control information may include Sidelink Control Information (SCI). For example, the PSCCH can include a first-stage SCI. A PSCCH resource may start at a first symbol of a slot, and may occupy 1, 2 or 3 symbols. The PSCCH may occupy up to one subchannel with the lowest subcarrier index. FIG. 3 also illustrates symbol(s) that may include PSSCH. The symbols in FIG. 3 that are indicated for PSCCH or PSSCH indicate that the symbols include PSCCH or PSSCH REs. Such symbols corresponding to PSSCH may also include REs that include a second-stage SCI and/or data. At least one symbol may be used for feedback (e.g., PSFCH), as described herein. As illustrated in FIG. 3, symbols 12 and 13 are indicated for PSFCH, which indicates that these symbols include PSFCH REs. In some aspects, symbol 12 of the PSFCH may be a duplication of symbol 13. A gap symbol prior to and/or after the feedback may be used for turnaround between reception of data and transmission of the feedback. As illustrated in FIG. 3, symbol 10 includes a gap symbol to enable turn-around for feedback in symbol 11. Another symbol, e.g., at the end of the slot (symbol 14) may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the PSCCH, PSSCH, PSFCH, and gap symbols may be different than the example illustrated in FIG. 3.

Figure 4:
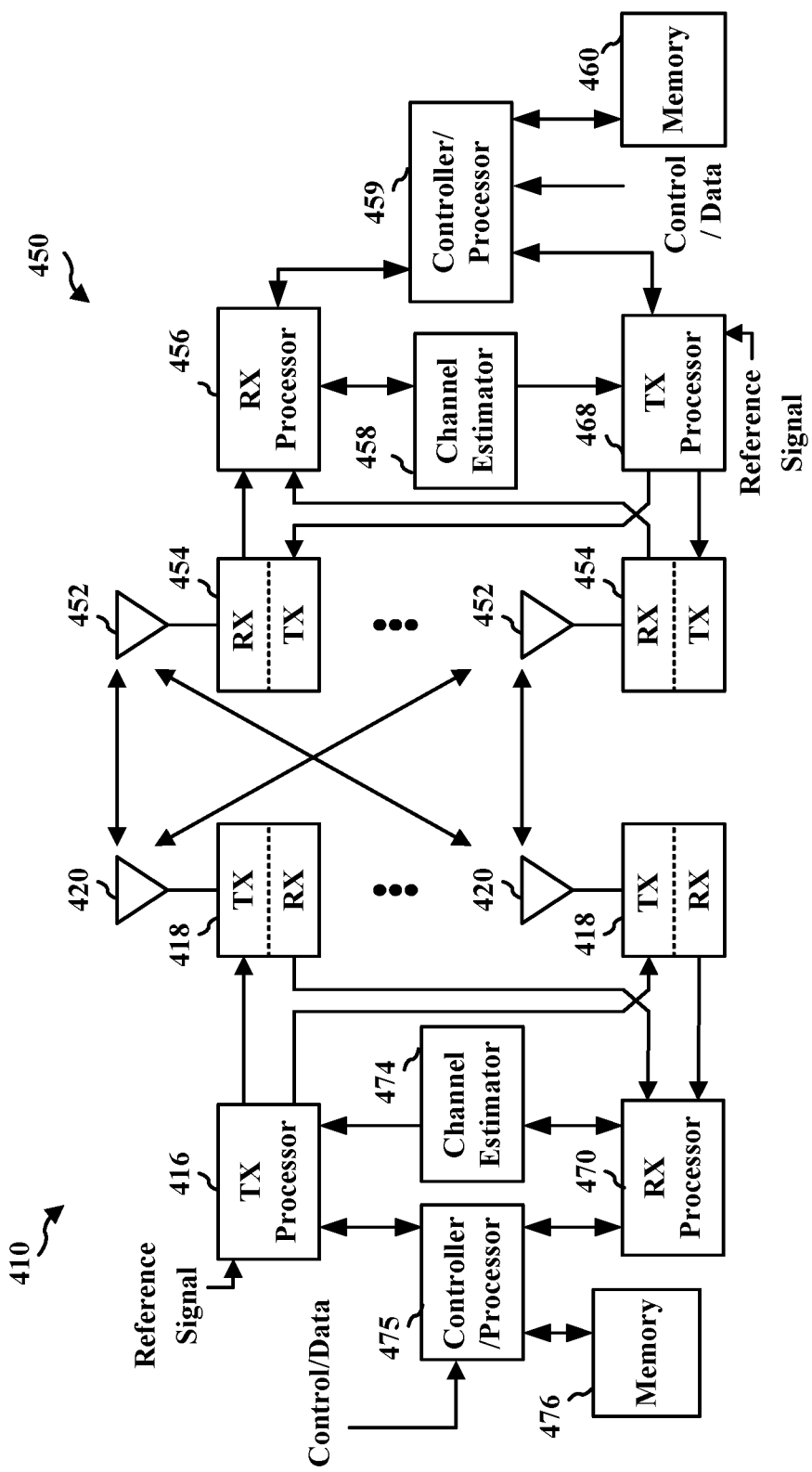
FIG. 4 is a diagram illustrating an example of a base station and user equipment (UE) in an access network.

FIG. 4 is a block diagram of a base station 410 in communication with a UE 450 in an access network. In the DL, IP packets from the EPC 160 may be provided to a controller/processor 475. The controller/processor 475 implements layer 4 and layer 2 functionality. Layer 4 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate an RF carrier with a respective spatial stream for transmission.

At the UE 450, each receiver 454RX receives a signal through its respective antenna 452. Each receiver 454RX recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements layer 4 and layer 2 functionality.

The controller/processor 459 can be associated with a memory 460 that stores program codes and data. The memory 460 may be referred to as a computer-readable medium. In the UL, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the DL transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the UL, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to control sidelink transmit power levels in connection with 198 and/or 199 of FIG. 1.

Sidelink Communications

In an aspect of the present disclosure, communications links between one UE and another UE may occur without the communications link travelling to/through base station. Although such communications links may occur within the same frequency bands as the uplink and/or downlink, such communications may be referred to as "sidelink" communications.

In an aspect of the present disclosure, sidelink communications may be used for D2D communications, such as vehicle-to-everything V2X, Industrial IoT (IIoT), and/or other short range communications between one UE and another UE. Sidelink communications between devices may allow more UEs to communicate without overloading base stations in a given area or region and/or to communicate outside the coverage area of any base station.

Sidelink communications may also enable automatic reporting of short-range direct communications data of vehicle telemetry, and, in an aspect of the present disclosure, allow for connections between short-range direct communications with an access network.

In an aspect of the present disclosure, sidelink communications may also reduce latency on time-sensitive data, such as safety messages related to road safety, traffic efficiency, etc. Sidelink communications may thus provide information to drivers, pedestrians, etc. in a short enough time period to allow the recipient of such data to alter their course of action in a timely manner, without using and/or overloading an access network.

In an aspect of the present disclosure, sidelink communications may comprise a plurality of modes that enable communication between UEs. For example, and not by way of limitation, UE may use some resources to "find" or "discover" one or more other UEs to communicate with, while other resources may be used to communicate data, voice, or other information once the discovery process has been completed by between the UEs.

Figure 5:
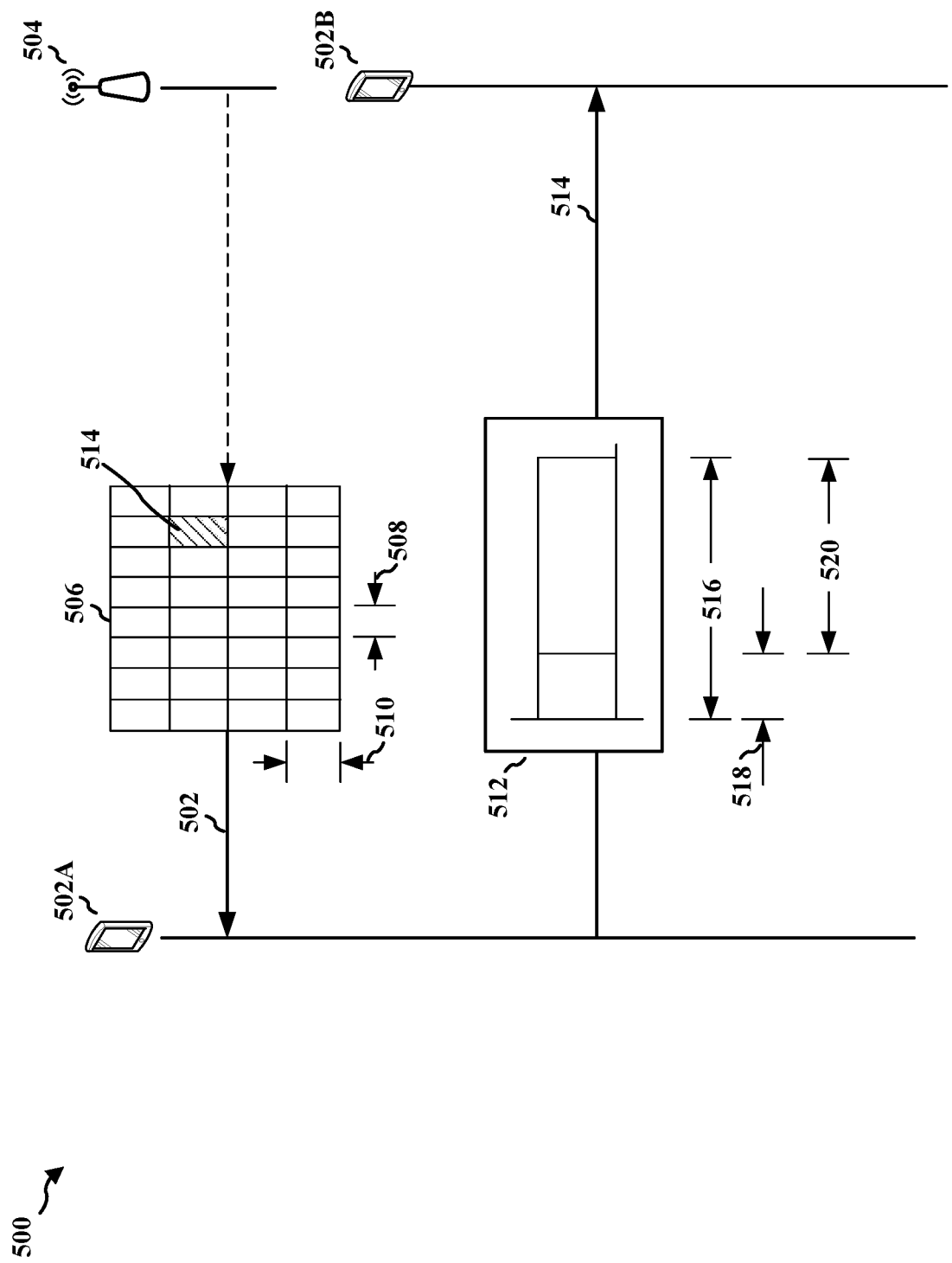
FIG. 5 illustrates a resource pool for sidelink communications in an aspect of the present disclosure.

FIG. 5 illustrates an example communication flow on resources of a resource pool for sidelink communications in an aspect of the present disclosure. In the context of FIGS. 1 and 4, a UE 502A may be implemented as UE 104 and/or UE 450, and base station 504 may be implemented as base station 102/180 and/or base station 410.

In call flow diagram 500, UE 502A may receive, from base station 504, a resource pool 506 to be used for sidelink communications. In an aspect of the present disclosure, UE 502A may be configured with resource pool 506 by other methods, e.g., resource pool 506 may be stored on memory (e.g., memory 460), provided on a subscriber identity module (SIM) card as part of UE 502A, etc.

Resource pool 506 is a collection of time/frequency resources that UE 502A may use for sidelink communications, and may comprise one or more slots 508 and/or subchannels 510 as shown in FIG. 5. Resource pool 506 and/or sidelink discovery procedures for a given UE 502 may be determined by a layer in the protocol stack, e.g., an application layer, a transport layer, a network layer, a data link layer such as a MAC layer or a lower level control (LLC) layer, or a PHY layer such as a baseband layer or a radio layer. In an aspect of the present disclosure, using different layers in the protocol stack for sideband discovery may result in power savings for UE 502.

UE 502A may use a set of resources (e.g., including at least a particular slot 508 and/or subchannel 510) in resource pool 506 only when the set of resources is not reserved, e.g., by another UE 502B to transmit a packet of higher priority or, if the resource is reserved by another UE 502B, the energy or signal strength (e.g., reference signal received power (RSRP) or signal-to-noise ratio (SNR)) of the signal transmitted by UE 502B is below a threshold value. These allocation rules for resources in resource pool 506 may reduce interference between signals being transmitted and received by UEs 502A, 502B, another UE, and/or base station 504.

Once UE 502A selects an appropriate resource from resource pool 506, UE 502A may send a message 512 on resource set 514 to one or more UE 502B that may be in an area proximate to UE 502A (e.g., UE 502A may be in the proximate area of another UE when UE 502A is capable of transmitting at a power at which the other UE is capable of successfully decoding the transmission). Although shown as including a particular slot 508 and subchannel 510 in resource pool 506, resource set 514 may be any set of one or more time/frequency resources in resource pool 506 without departing from the scope of the present disclosure.

In an aspect of the present disclosure, UE 502A and UE 502B may employ one or more approaches in forming a communications link between UE 502A and UE 502B. In an aspect of the present disclosure, some resources in resource pool 506 may be dedicated for discovery of other UE 502B that is in close proximity with UE 502A, while other resources in resource pool 506 may be dedicated to established communications links, such as a data (or shared) channel and/or a control channel. In another aspect of the present disclosure, a certain portion of a time period (e.g., one or more symbols and/or one or more slots) may be employed for discovery, while the remaining portion of the time period (e.g., one or more other symbols and/or one or more other slots) may be dedicated to communication between UE 502A and UE 502B.

For example, and not by way of limitation, message 512 may be sent by UE 502A on resource set 514 during a plurality of slots 516. If the message 512 is a discovery message, it may be sent during a discovery portion 518 of plurality of slots 516. If the message 512 is a communications message, it may be sent during a communications portion 520 of plurality of slots 516. Discovery portion 518 and communications portion 520 may occur at any time within plurality of slots 516, and may multiple portions of plurality of slots 516, e.g., discovery portion 518 and/or communications portion 518 may be noncontinuous within plurality of slots 516.

In such an aspect, UE 502A can conserve power usage during communications portion 518 if UE 502A is attempting discovery of one or more other UE 502B, and/or UE 502B can conserve power usage if UE 502B is not attempting discovery and already communicating with UE 502A by powering down all or some transmission circuitry, such as a transmitter processor (e.g., TX processor 468) during the corresponding portion of plurality of slots 516.

Figure 6:
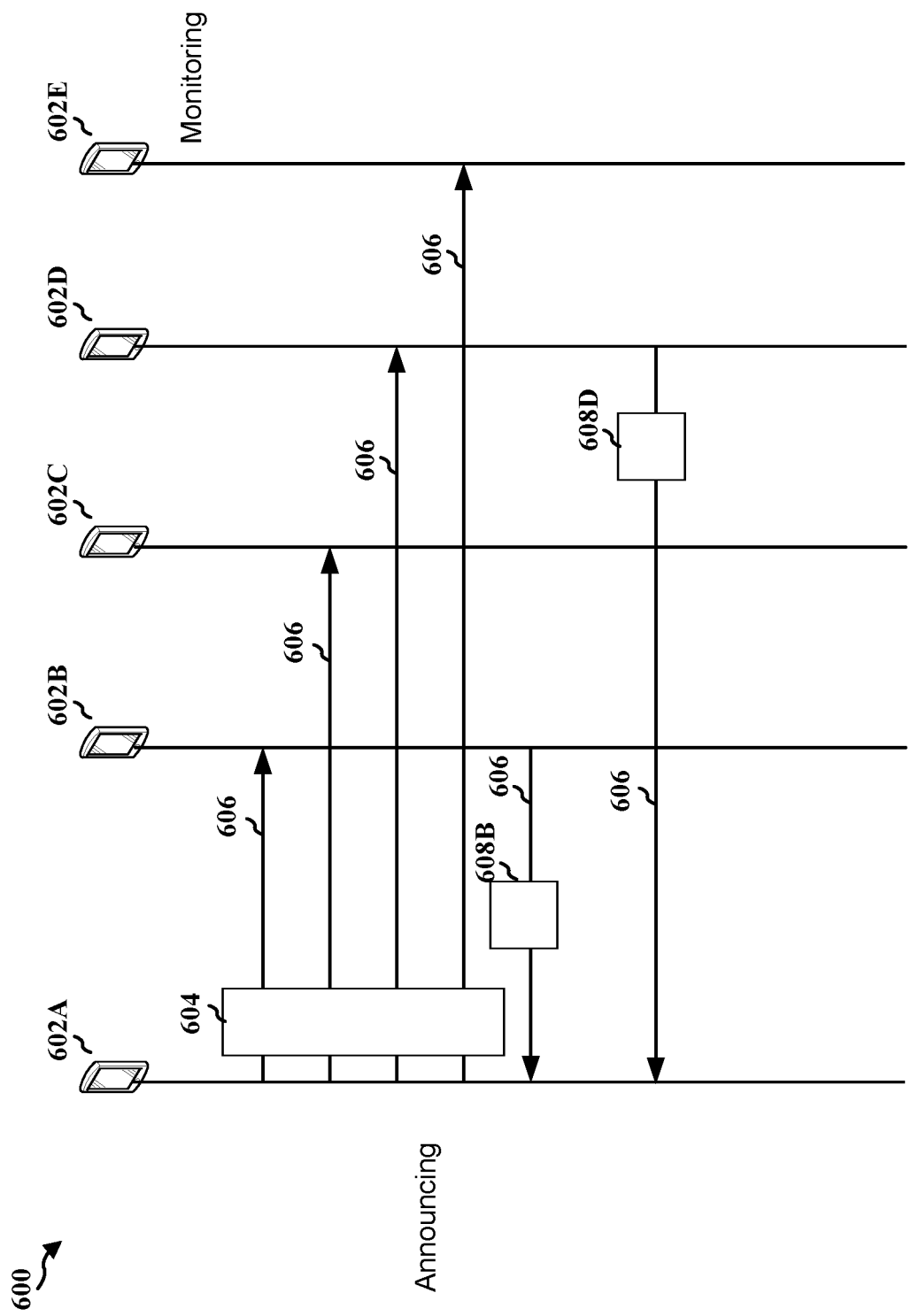
FIG. 6 illustrates a discovery process for sidelink communications in accordance with an aspect of the present disclosure.

FIG. 6 illustrates a discovery process for sidelink communications in accordance with an aspect of the present disclosure.

In flow diagram 600, UE 602A sends message 604 on resource set 606. Message 604 may be a broadcast message, i.e., a message that is sent as a general broadcast and may be received by one or more UEs in geographical proximity to UE 602A, e.g., UE 602B, UE 602C, UE 602D, and UE 602E. Message 604 may be an "announcement" type of message, e.g., a message in accordance with Model A, announcing "UE 602A is here," indicating that UE 602A is in a particular geographical area. In such an aspect, UE 602A may be referred to as the "announcing" UE, while UE 602B-602E are referred to as the "monitoring" UEs.

In an aspect of the present disclosure, message 604 may be a discovery message, e.g., a message in accordance with Model B stating "who is out there?" which may determine which other UE 602B-602E are in geographical proximity to UE 602A. In such an aspect, UE 602A may be referred to as the "discoverer" UE, while 602B-602E are referred to as the "discoveree" UEs.

Some of the UE 602B-602E may not receive announcement 604 for one or more reasons, e.g., announcement 604 was not transmitted by UE 602A with enough power for one or more of UE 602B-602E to receive message 604, one or more of UE 602B-602E may be already engaged in communications with other UEs, geographical terrain blocking, and/or other reasons.

Message 604 may be sent in a discovery portion of sidelink communications links, e.g., discovery portion 518 of plurality of slots 516 as described with respect to FIG. 5. A response 608, which may be a unicast message and/or a group cast message, may be sent by one or more of UE 602B-602E on resource set 606 as a reply to UE 602A. As shown in FIG. 6, response 608B is sent by UE 602B on resource set 606 and response 608D is sent by UE 602D on resource set 606 to UE 602A. Once a communications link is established between two UE on a sidelink, UE 602A may then begin communications with UE 602B and/or UE 602D, either on resource set 606 or another resource within resource pool 506, in the communications portion 520 of frame period 506.

UE 602A may monitor all of plurality of slots 516 and/or communications portion 520 for one or more frame periods 516 to determine if resource set 606 is already being used by other UE 602 in the geographic area of UE 602A prior to sending message 604. If resource set 606 is already being used and/or is reserved for communication between other UE 602, UE 602A may select a different resource within resource pool 506 to transmit message 604.

Discovery Transmit Power Determination

Figure 7:
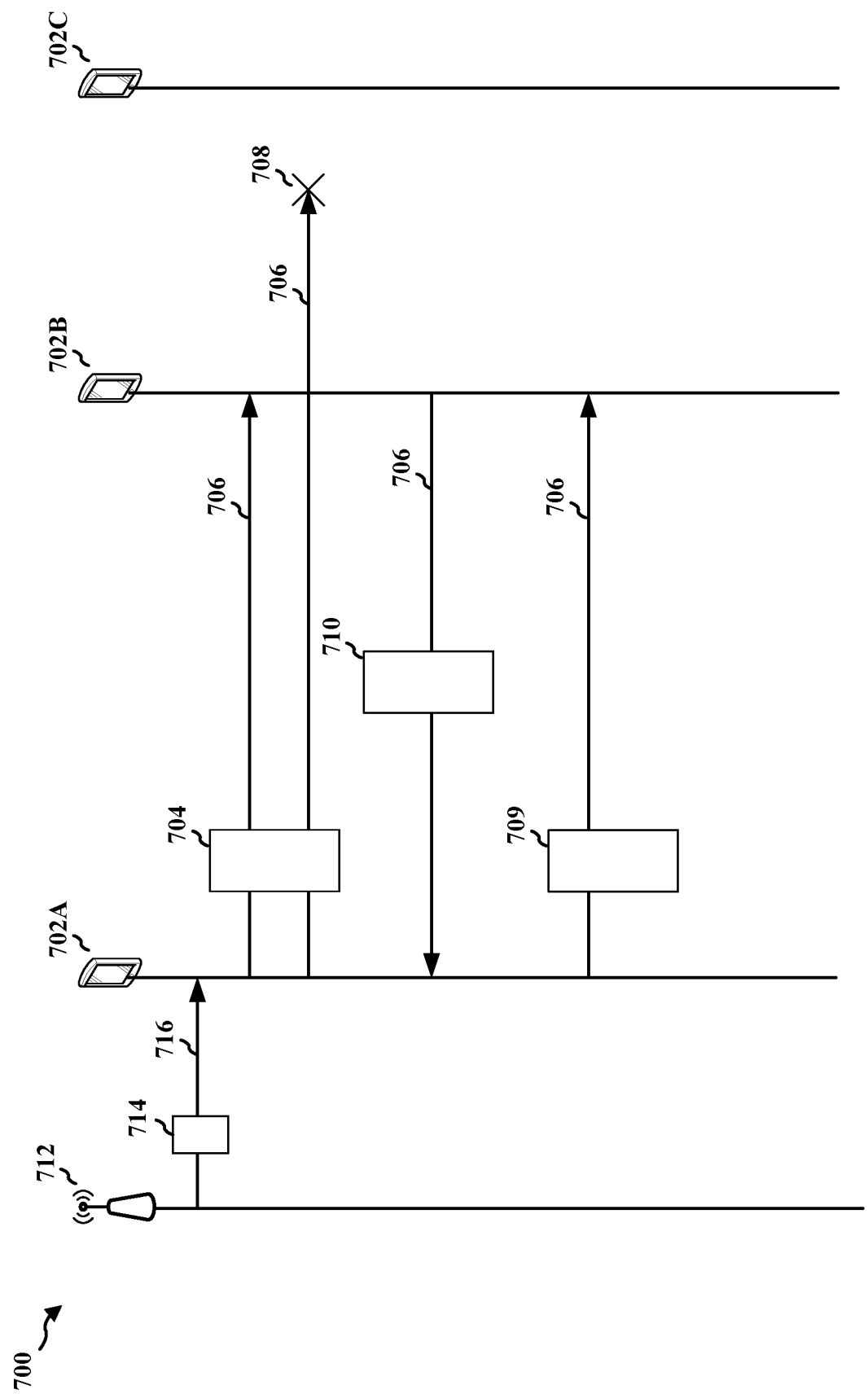
FIG. 7 illustrates a process for sidelink communications in accordance with an aspect of the present disclosure.

FIG. 7 illustrates a process for sidelink communications in accordance with an aspect of the present disclosure. Flow diagram 700 illustrates UE 702A, UE 702B, and UE 702C, where UE 702A transmits message 704 on resource set 706. In an aspect of the present disclosure, depending on the transmit power employed by UE 702A to transmit message 704, the pathloss between UE 702A and UE 702B, UE 702C, and/or other factors, one or more of UE 702B, UE 702C may receive message 704 while others of UE 702B, UE 702C may not receive message 704. For example, and not by way of limitation, FIG. 7 illustrates UE 702B receiving message 704 on resource set 706 while UE 702C does not receive message 704. To indicate that UE 702C does not receive message 704, marker 708 is shown as interfering with message 704 somewhere between UE 702A and UE 702C.

UE 702A, prior to sending message 704, may have no indication that other UEs, e.g., UE 702B, UE 702C are within transmission range and thus available for sidelink communications. In an aspect of the present disclosure, UE 702A may determine and/or be assisted in determining how much transmission power to use in transmitting message 704. Once one or more of UE 702B-UE 702C receives message 704, those UEs that receive message 704 may respond to UE 702A on resource set 706 with response 710.

Once UE 702A receives one or more responses 710, UE 702A may then acknowledge receipt of message 704 with acknowledgement 709 and begin communicating with those UE 702 that responded to message 704 on resource set 706.

In an aspect of the present disclosure, UE 702A-UE 702C may use open loop power control (OLPC) to determine an initial and/or increases in transmission power to be used to transmit message 704 and/or transmit response 710.

For example, and not by way of limitation, in an aspect of the present disclosure, UE 702A can be configured to use a certain transmission power based on the application that UE 702A is running. For example, if UE 702A is transmitting a message 704 (e.g., a distress, a public safety message, or other high priority message), UE 702A may use maximum transmission power in order to reach as many other UE 702B, UE 702C in the proximate geographic area as possible. If UE 702A is using a social media application or a home IOT application, a different initial transmission power may be used by UE 702A in order to reach only those UEs 702B-702C that are geographically closest to UE 702A.

In an aspect of the present disclosure, UE 702A may be configured by base station 712 through message 714 on link 716, with one or more control parameters. Link 716 may be PDSCH, PBCH, DCI, and/or any other link between base station 712 and UE 702A. In an aspect of the present disclosure, UE 702A may be self-configured (e.g., pre-configured) through programming of UE 702A, SIM memory in UE 702A, and/or other methods.

In an aspect of the present disclosure, UE 702A may be configured with one or more power control parameters that may relate to the downlink pathloss, i.e., the loss of signal strength between base station 712 and UE 702A. In an aspect of the present disclosure, UE 702A may, alternatively and/or additionally, be configured with one or more power control parameters that may relate to the sidelink pathloss, i.e., the loss of signal strength between UE 702A and one or more UE 702B-702C. UE 702A may use one or more power control parameters relating to the downlink pathloss, and/or one or more power control parameters relating to the sidelink pathloss, in determining the transmission power UE 702A uses to transmit message 704.

In an aspect of the present disclosure, UE 702A may use a downlink pathloss to determine transmit power to transmit message 704 on a sidelink channel/slot, which may be a sidelink discovery channel/slot, to another UE 702. In such an aspect, UE 702A may use a downlink pathloss to determine transmit power to reduce interference with base station 712 signal reception, as sidelink resource set 706 may be commonly used for uplink communications between UEs 702 and base station 712.

Transmit power for UE 702A, referred to as $P_D$, may be given by:

$$P_D = P_{0,D} + 10 \log_{10}(2^\mu \cdot M_{RB}(i)) + \alpha_D \cdot PL_D$$

where, $P_{0,D}$ is a received power level, i.e., the power level of the signal transmitted by base station 712 and received by UE 702A, $\mu$ is the subcarrier spacing, $M_{RB}$ is the bandwidth of the resource set 706, e.g., the number of resource blocks used by resource set 706, $\alpha_D$ is the partial pathloss compensation factor, and $PL_D$ is the pathloss in the downlink.

In an aspect of the present disclosure, UE 702A may use a sidelink pathloss to determine transmit power to transmit message 704 on a sidelink channel/slot to another UE 702. In such an aspect, transmit power for UE 702A, referred to as $P_S$, may be given by:

$$P_S = P_{0,S} + 10 \log_{10}(2^\mu \cdot M_{RB}(i)) + \alpha_S \cdot PL_S$$

where $P_{0,S}$ is a received power level, i.e., the power level of a signal received by UE 702A, $\mu$ is the subcarrier spacing, $M_{RB}$ is the bandwidth of the resource set 706, i.e., the number of resource blocks used by resource set 706, as is the partial pathloss compensation factor, and $PL_S$ is the pathloss in the sidelink.

In an aspect of the present disclosure, UE 702A may use both a sidelink pathloss and a downlink pathloss to determine transmit power to transmit message 704 on a sidelink channel/slot to another UE 702. In such an aspect, transmit power for UE 702A, referred to as P, may be given by:

$$P = \min\{P_{cmax}, P_{max,CBR}, \min\{P_S, P_D\}\}$$

where $P_{cmax}$ is the maximum transmit power that UE 702A can generate, $P_{maxCBR}$ is a maximum power determined based on a congestion level of other transmissions in geographic proximity to UE 702A, i.e., if there is a larger number of UE 702 geographically proximate to UE 702A, $P_{maxCBR}$ will be smaller, as the interference caused by transmission on resource set 706 would be greater, and min $\{P_S, P_D\}$ is the minimum of $P_S$ and $P_D$.

In such an aspect, the minimum of $P_{cmax}$, $P_{maxCBR}$, $P_S$ and $P_D$ would give a value for P, as the minimum value would create less interference with other resources being employed by base station 712 and/or other UE 702 that are geographically proximate to UE 702A.

One or more power control parameters $P_{0,D}$, and/or $\alpha_D$ may be configured by UE 702A and/or transmitted to UE 702A by base station 712. In an aspect of the present disclosure, one set of values for the power control parameters may be configured for UE 702A to discover other UE 702B-UE 702C, while a different set of values for the power control parameters may be configured for UE 702A to communicate with other UE 702B-UE 702C.

In an aspect of the present disclosure, different power control parameters may be configured for different types of messages 704 and/or responses 710 within a given resource pool (e.g., during a discovery procedure). For example, and not by way of limitation, message 704, which may be a broadcast message, may have a different set of power control parameters than response message 710, which may be a unicast message, and yet another set of power control parameters may be configured for a group cast message. Further, such parameters may differ within the same resource pool, e.g., the discovery resource pool and/or the communications resource pool.

In an aspect of the present disclosure, UE 702A may be configured with one or more sidelink pathloss values, referred to as "reference sidelink pathloss values" herein. One or more reference sidelink pathloss values may be used by UE 702A to determine a transmit power for message 704 that is transmitted during discovery of other UE 702.

In such an aspect, the one or more reference sidelink pathloss values may be used to control the range over which message 704 can be received by UE 702B-UE 702C. For example, and not by way of limitation, a smaller sidelink pathloss value, which may determine a smaller transmit power used by UE 702A, would limit the range that message 704 can be adequately received and/or decoded by other UE 702B-702C. As shown in FIG. 7, UE 702A may be able to discover UE 702B, because message 704 was received by UE 702B and UE 702B transmitted response 710. However, UE 702A may not be able to discover UE 702C, because message 704 was not received by UE 702C, illustrated by marker 708. UE 702A may not be able to discover UE 702C for one or more reasons, e.g., UE 702C is at too great of a distance from UE 702A, and thus the transmit power used by UE 702A to transmit message 704 was too small, terrain between UE 702A and UE 702C interfered with message 704, and/or other reasons. Similarly, UE 702B may be able to discover UE 702A, while UE 702C cannot discover UE 702A at a given transmission power.

In an aspect of the present disclosure, if the one or more reference sidelink pathloss values are not configured, and/or are configured to be "−∞", UE 702A may not use the sidelink pathloss to determine the transmit power for the message 704. In such an aspect, UE 702A may transmit the message 704 at the maximum power that UE 702A is allowed to transmit at, subject to any interference limits that UE 702A transmission on sidelink channels may have with uplink communication with base station 712, which may be determined by the downlink pathloss.

In an aspect of the present disclosure, UE 702A may select a reference sidelink pathloss value from the one or more reference sidelink pathloss values based on an application and/or service that UE 702A is employing to discover UE 702B-UE 702C. UE 702A may also select a reference sidelink pathloss value from the one or more reference sidelink pathloss value based on a protocol layer level that UE 702A is employing for sidelink communications.

In an aspect of the present disclosure, UE 702A may begin at a determined transmission power, which may be determined by downlink pathloss, sidelink pathloss, and/or reference sidelink pathloss values as described herein. If another UE 702B-702C is not discovered within a determined time, UE 702A may gradually increase the transmission power used to send message 704. In such an aspect, UE 702A may be constrained by $P_{cmax}$, $P_{maxCBR}$, $P_S$ and/or $P_D$, and/or other constraints, because increased power transmissions by UE 702A may violate other transmission constraints placed on UE 702A in a given geographic area. For example, and not by way of limitation, UE 702A, when in a geographic area having a large number of other UE 702, may not be able to increase transmission power beyond a certain point without interfering with other transmission from base station 712 and/or other UE 702B-UE 702C; thus, there may be a limit on how much UE 702A may increase transmission power.

In an aspect, the amount of increase of transmission power, i.e., the change in transmission power used by UE 702A may be based on one or more factors. For example, and not by way of limitation, the change in transmission power may be based on one or more of the reference sidelink pathloss values, the downlink pathloss, a fixed change in transmission power, and/or other factors.

Response Transmission Power

In an aspect of the present disclosure, message 704 may include information related to the transmit power used by UE 702A to transmit message 704. In such an aspect, those UE 702 that receive message 704, e.g., UE 702B as shown in FIG. 7, may determine the actual sidelink pathloss between UE 702A and UE 702B. Such information may include information related to the DMRS of a sidelink control channel (e.g., PSCCH) or sidelink data channel (e.g., PSSCH), and/or synchronization signal or physical sidelink broadcast channel (PSBCH). Such information may include the actual transmit power used by UE 702A to transmit the message 704 and/or other information such that UE 702B can determine an actual and/or approximate sidelink pathloss between UE 702A and UE 702B. UE 702B may then use the information in message 704 to determine the unicast transmit power that UE 702B will use to transmit response 710.

In an aspect of the present disclosure, UE 702B may use one or more reference sidelink pathloss values to determine the transmit power that UE 702B will use to transmit response 710 to UE 702A. UE 702B may receive the one or more reference sidelink pathloss values from a base station 712, or may be preconfigured to contain one or more sidelink pathloss values.

In an aspect of the present disclosure, UE 702B may increase transmission power for transmitting response 710 if acknowledgement 709 is not received by UE 702B within a determined time period.

Figure 8:
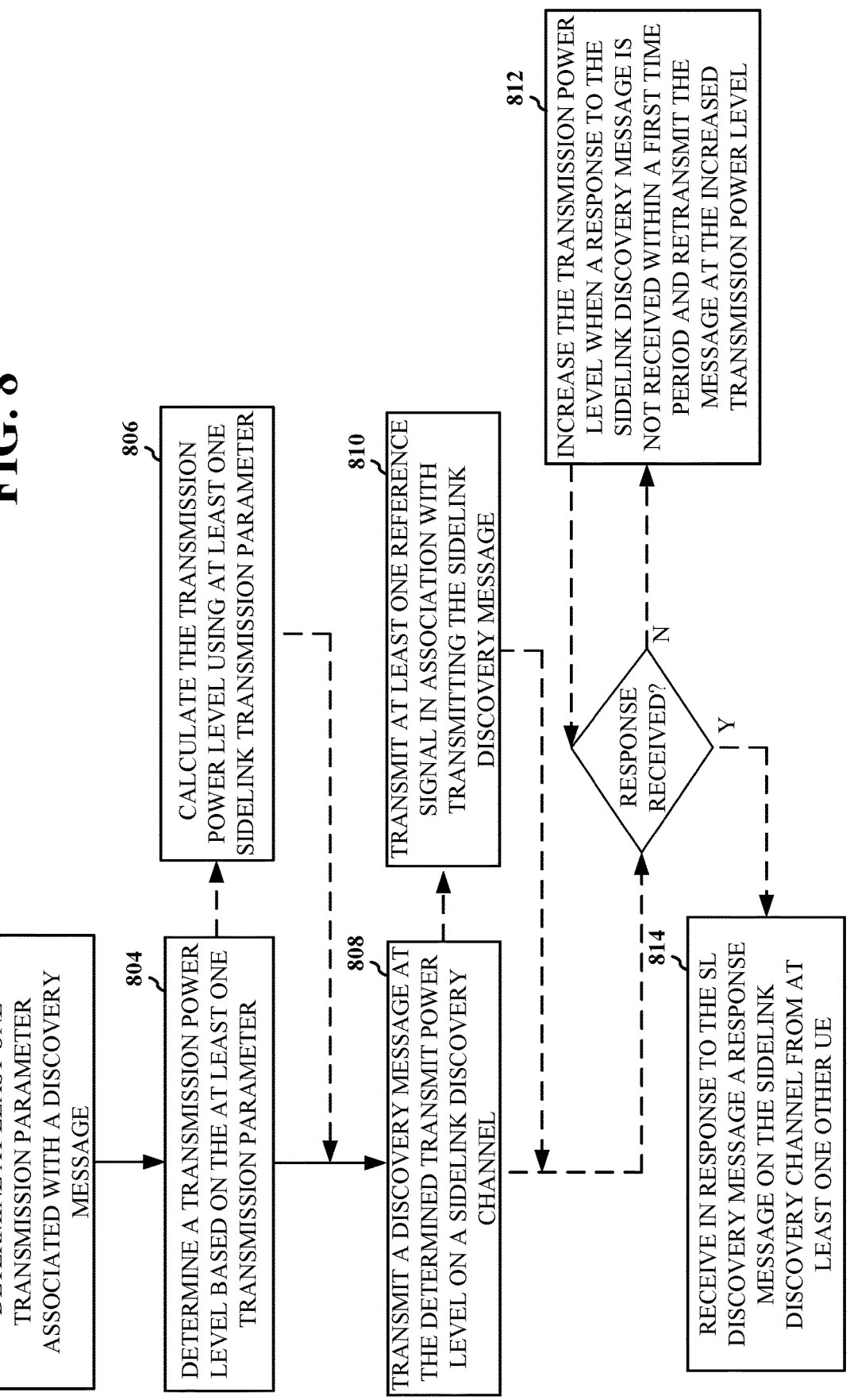
FIG. 8 is a flowchart of a method of wireless communication in accordance with an aspect of the present disclosure.

FIG. 8 is a flowchart 800 of a method of wireless communication in accordance with an aspect of the present disclosure. The method may be performed by a UE (e.g., the UE 104, any of UE 502A, UE 502B, 602A-UE 602E, UE 702A-UE 702C). The UE may be assisted by a base station (base station 104/180, 504, and/or 712). As illustrated, the flowchart 800 includes a number of enumerated steps, but embodiments of the flowchart 800 may include additional steps before, after, and in between the enumerated steps. In some embodiments, one or more of the enumerated steps may be omitted or performed in a different order. Optional aspects are illustrated with a dashed line.

At 802, the UE determines at least one transmission parameter associated with a discovery message at the first UE. For example, in the context of FIG. 6, UE 602A may determine at least one transmission parameter, e.g., a downlink pathloss, a sidelink pathloss, a reference sidelink pathloss value, etc. 802 may be performed by one or more components described with respect to FIG. 4, e.g., processor 459. The at least one transmission parameter may be determined, e.g., by the transmission parameter determination component 1040 of the apparatus 1002 in FIG. 10.

At 804, the UE determines a transmit power level based on the at least one transmission parameter. For example, in the context of FIG. 6, UE 602A may determine a transmit power level based on the at least one transmission parameter determined in 802. 804 may be performed by one or more components described with respect to FIG. 4, e.g., processor 459. Depending on the configuration of the UE, control may pass from 804 to one or more of 806 and/or 808. The transmit power level based on the at least one transmission parameter may be determined, e.g., by the transmission power level determination component 1042 of the apparatus 1002 in FIG. 10.

At 806, the UE may, in conjunction with 804, calculate the transmission power level using at least one SL transmission parameter. For example, in the context of FIG. 6, UE 602A may calculate the transmission power level using at least one SL transmission parameter, e.g., sidelink pathloss, reference sidelink pathloss value, etc. 806 may be performed by one or more components described with respect to FIG. 4, e.g., processor 459. Control may pass from either 804 and/or 806 to 808. The transmission power level using the at least one SL transmission parameter may be determined, e.g., by the transmission power level determination component 1042 of the apparatus 1002 in FIG. 10.

At 808, the UE transmits a discovery message at the determined transmit power level on a SL discovery channel. For example, in the context of FIG. 6, UE 602A may transmit message 704 on resource set 606, or in the context of FIG. 7, UE 702A may transmit message 704 on resource set 706. 808 may be performed by one or more components described with respect to FIG. 4, e.g., processor 459, transmit processor 468, receiver/transmitter 454 and/or antenna 452. Depending on the configuration of the UE, control may pass from 808 to one or more of 810 and/or 812. The discovery message may be transmitted, e.g., by the sidelink discovery message component 1044 of the apparatus 1002 through the transmission component 1034 of the apparatus 1002 in FIG. 10.

At 810, the UE transmits at least one reference signal in association with transmitting the SL discovery message. For example, in the context of FIG. 6, UE 602A may transmit message 704 including DRMS, a synchronization signal, or a PSBCH on resource set 606, or in the context of FIG. 7, UE 702A may transmit message 704 including DRMS, a synchronization signal, and/or a PSBCH on resource set 706. 810 may be performed by one or more components described with respect to FIG. 4, e.g., processor 459, transmit processor 468, receiver/transmitter 454 and/or antenna 452. Depending on the configuration of the UE, control may pass from 810 to one or more of 812 and/or 814. The at least one reference signal may be transmitted, e.g., by the reference signal component 1048 of the apparatus 1002 through the transmission component 1034 of the apparatus 1002 in FIG. 10.

If a response to the SL discovery message is not received at the UE, at 812 the UE increases the transmission power level when a response to the SL discovery message is not received on the SL discovery channel within a first time period and retransmits the SL discovery message at the increased transmission power level after the first time period. For example, in the context of FIG. 7, UE 702A may increase the transmit power level to retransmit message 704 on resource set 706 if response 709 is not received within a certain time period. 812 may be performed by one or more components described with respect to FIG. 4, e.g., processor 459, transmit processor 468, receiver/transmitter 454 and/or antenna 452. The transmission power level may be adjusted, e.g., by the transmission power level adjustment component 1046 of the apparatus 1002 in FIG. 10.

At 814, the UE receives, in response to the SL discovery message, a response message on the sidelink channel from at least one other UE. For example, in the context of FIG. 7, UE 702A may receive response 709 on resource set 706 from UE 702B. 814 may be performed by one or more components described with respect to FIG. 4, e.g., receiver/transmitter 454 and/or antenna 452. The response message may be received, e.g., by the sidelink discovery response component 1050 of the apparatus 1002 through the reception component 1030 of the apparatus 1002 in FIG. 10.

Figure 9:
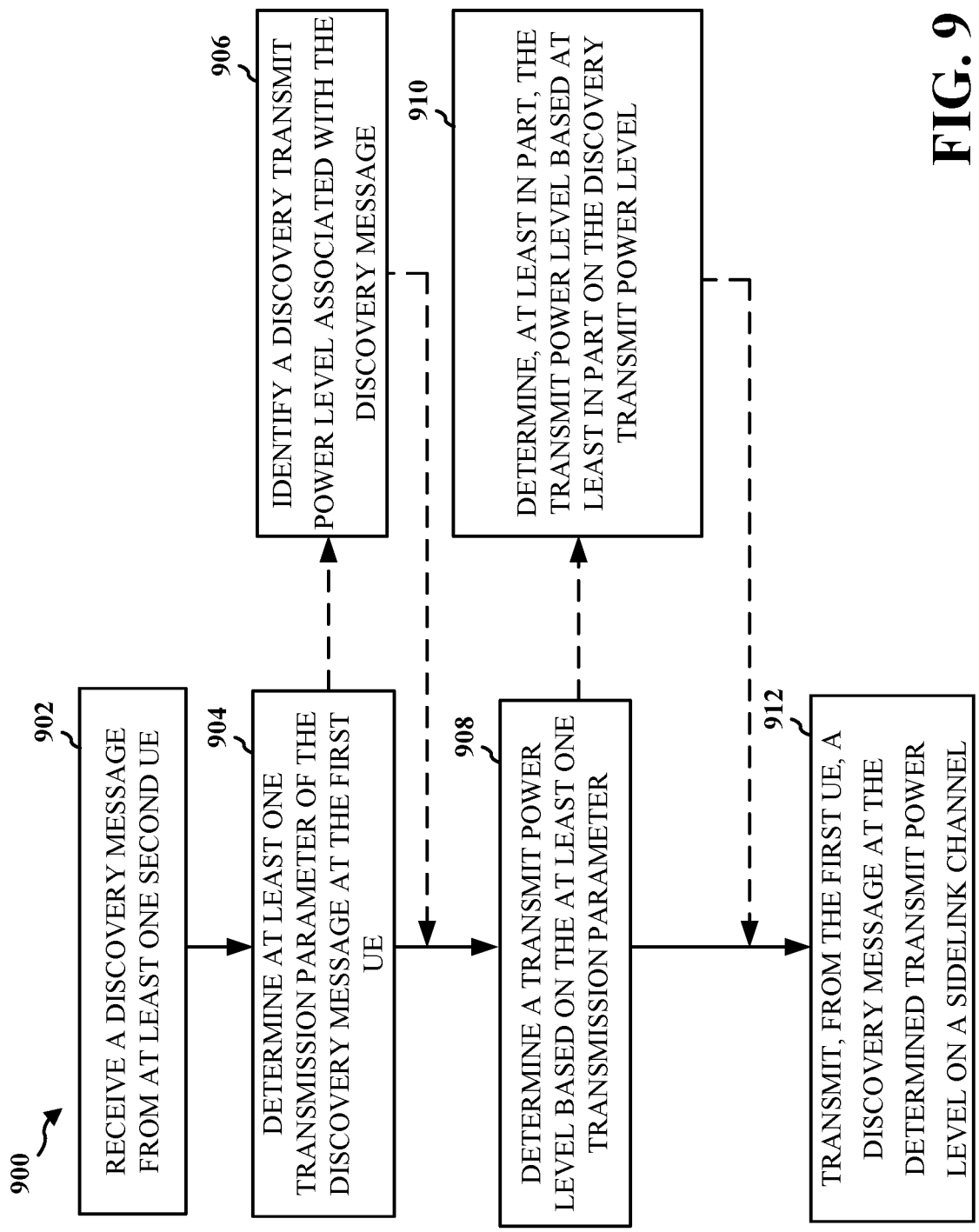
FIG. 9 is a flowchart of a method of wireless communication in accordance with an aspect of the present disclosure.

FIG. 9 illustrates a flowchart 900 of a method of wireless communication in accordance with an aspect of the present disclosure. The method may be performed by a UE (e.g., the UE 104, any of UE 502A, UE 502B, 602A-UE 602E, UE 702A-UE 702C). The UE may be assisted by a base station (base station 104/180, 404, and/or 712). As illustrated, the flowchart 900 includes a number of enumerated steps, but embodiments of the flowchart 900 may include additional steps before, after, and in between the enumerated steps. In some embodiments, one or more of the enumerated steps may be omitted or performed in a different order. Optional aspects are illustrated with a dashed line.

At 902, the UE receives a discovery message from at least one second UE. For example, in the context of FIG. 6, UE 602B may receive message 704 from UE 702A. 902 may be performed by one or more components described with respect to FIG. 4, e.g., receiver 454. The discovery message may be received, e.g., by the sidelink discovery message component 1044 of the apparatus 1002 through the reception component 1030 of the apparatus 1002 in FIG. 10.

At 904, the UE determines at least one transmission parameter of the received discovery message, e.g., a downlink pathloss, a sidelink pathloss, a reference sidelink pathloss value, etc. For example, in the context of FIG. 7, UE 702B may determine at least one transmission parameter, e.g., a downlink pathloss, a sidelink pathloss, a reference sidelink pathloss value, etc. 904 may be performed by one or more components described with respect to FIG. 4, e.g., processor 459. Depending on the configuration of the UE, control may pass from 904 to one or more of 906 and/or 908. The at least one transmission parameter may be determined, e.g., by the transmission parameter determination component 1040 of the apparatus 1002 in FIG. 10.

At 906, the UE identifies a discovery transmit power level associated with the discovery message. For example, in the context of FIG. 7, UE 702B may identify a discovery transmit power level in message 704, indicating the transmit power level used by UE 702A. 906 may be performed by one or more components described with respect to FIG. 4, e.g., receive processor 456 and/or processor 459. Control passes from 906 to 908. The discovery transmit power level associated with the discovery message may be identified, e.g., by the transmission power level determination component 1042 of the apparatus 1002 in FIG. 10.

At 908, the UE determines the transmit power level based on the at least one transmission parameter. For example, in the context of FIG. 7, UE 702B may calculate the transmission power level of response 709 using at least one SL transmission parameter, e.g., sidelink pathloss, reference sidelink pathloss value, etc. 908 may be performed by one or more components described with respect to FIG. 4, e.g., processor 459. Depending on the configuration of the UE, control may pass from 908 to one or more of 910 and/or 912. The transmit power level based on the at least one transmission parameter may be determined, e.g., by the transmission power level determination component 1042 of the apparatus 1002 in FIG. 10.

At 910, the UE determines, at least in part, the transmit power level based at least in part on the discovery transmit power level. For example, in the context of FIG. 7, UE 702B may calculate the transmission power level of response 709 using the transmit power level of message 704, as in 906. 910 may be performed by one or more components described with respect to FIG. 4, e.g., processor 459. Control passes from 910 to 912. The transmit power level based at least in part on the discovery transmit power level may be determined, e.g., by the transmission power level determination component 1042 of the apparatus 1002 in FIG. 10.

At 912, the UE transmits a discovery message at the determined transmit power level on a SL discovery channel. For example, in the context of FIG. 7, UE 602B may transmit response 709. 912 may be performed by one or more components described with respect to FIG. 4, e.g., processor 459, transmit processor 468, receiver/transmitter 454 and/or antenna 452. The discovery message may be transmitted, e.g., by the sidelink discovery message component 1044 of the apparatus 1002 through the transmission component 1034 of the apparatus 1002 in FIG. 10.

Figure 10:
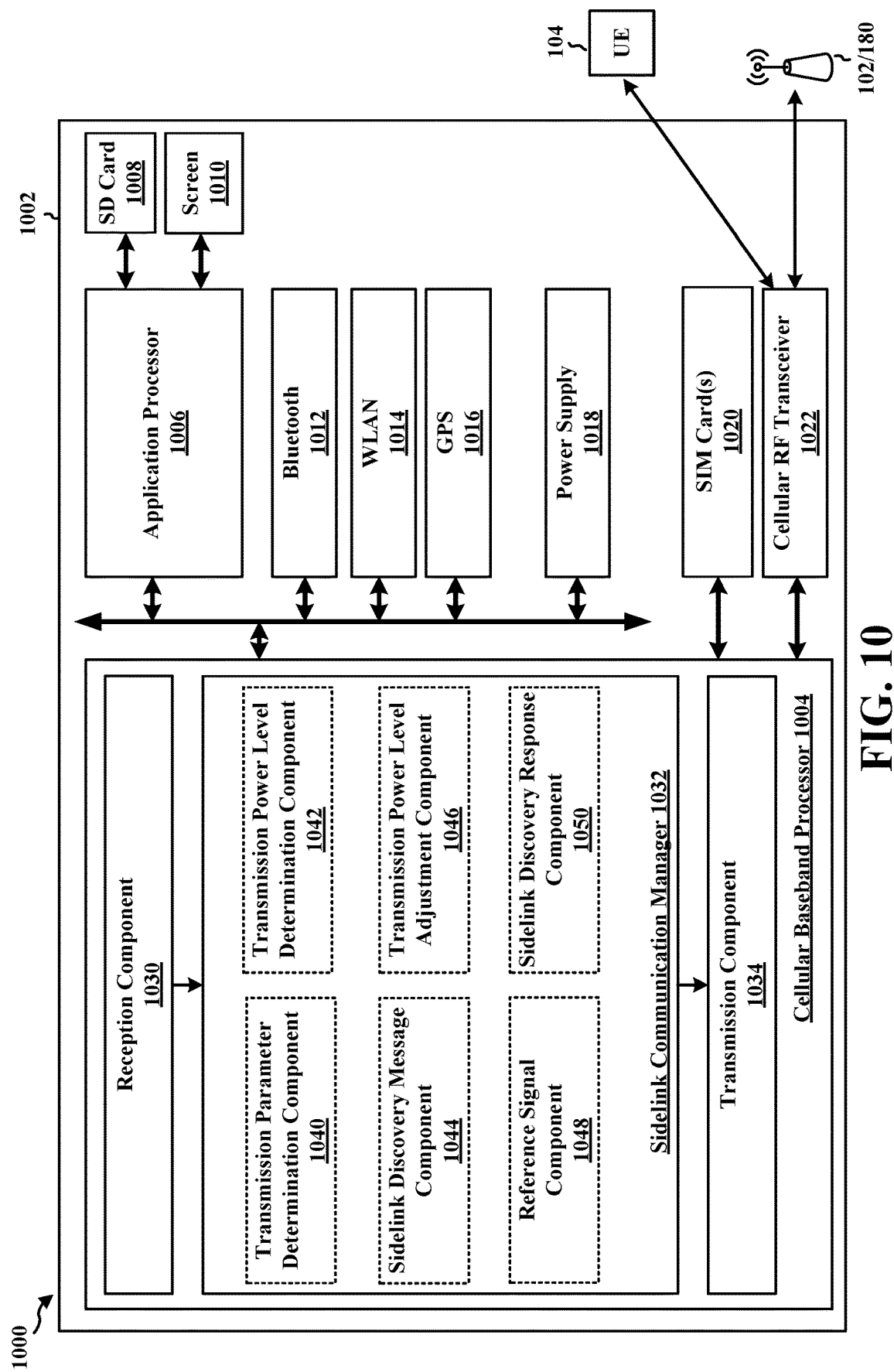
FIG. 10 is a diagram illustrating an example of a hardware implementation for an example apparatus.

FIG. 10 is a diagram 1000 illustrating an example of a hardware implementation for an apparatus 1002. The apparatus 1002 may be a UE or other wireless device that communicates based on sidelink. The apparatus 1002 includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with other wireless devices, such as a UE 104 and/or base station 102/180. The cellular baseband processor 1004 may include a computer-readable medium/memory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a sidelink communication manager 1032, and a transmission component 1034. The sidelink communication manager 1032 includes the one or more illustrated components. The components within the sidelink communication manager 1032 may be stored in the computer-readable medium/memory and/or configured as hardware within the cellular baseband processor 1004. The cellular baseband processor 1004 may be a component of the device 410 or 450 and may include the memory 460 or 470 and/or at least one of the TX processor 416 or 468, the RX processor 456 or 470, and the controller/processor 459 or 475. In one configuration, the apparatus 1002 may be a modem chip and include just the baseband processor 1004, and in another configuration, the apparatus 1002 may be the entire wireless device (e.g., see the device 410 or 450 of FIG. 4) and include the additional modules of the apparatus 1002.

The sidelink communication manager 1032 includes a transmission parameter determination component 1040, a transmission power level determination component 1042, a sidelink discovery message component 1044, a transmission power level adjustment component 1046, a reference signal component 1048, and/or a sidelink discovery response component 1050 configured to perform the aspects described in connection with methods in FIG. 8 and/or FIG. 9. The apparatus is illustrated as including components to perform the method of FIG. 8 and/or FIG. 9, because the wireless device may operate as a transmitting device at times and may operate as a receiving device at other times. In other examples, the apparatus 1002 may include components for the method of FIG. 8 without including components configured to perform the method of FIG. 9, or may include components for the method of FIG. 9 without including components configured to perform the method of FIG. 8.

The apparatus 1002 may include additional components that perform each of the blocks of the algorithm in the aforementioned flowcharts of FIGS. 8 and/or 9. As such, each block in the aforementioned flowcharts of FIGS. 8 and/or 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for determining at least one transmission parameter at the first UE. The apparatus 1002 may further include means for determining a transmission power level based on the at least one transmission parameter. The apparatus 1002 may further include means for transmitting a discovery message at the determined transmission power level on a sidelink channel.

The apparatus 1002 may further include means for receiving, at the first UE, a first discovery message from the at least one second UE. The apparatus 1002 may further include means for determining at least one transmission parameter of the first discovery message at the first UE. The apparatus 1002 may further include means for determining a transmit power level based on the at least one transmission parameter. The apparatus 1002 may further include means for transmitting, from the first UE, a second discovery message at the determined transmit power level on a sidelink channel.

The aforementioned means may be one or more of the aforementioned components of the apparatus 1002 configured to perform the functions recited by the aforementioned means. As described supra, the apparatus 1002 may include the TX Processor 416 or 468, the RX Processor 456 or 470, and the controller/processor 459 or 475. As such, in one configuration, the aforementioned means may be the TX Processor 416 or 468, the RX Processor 456 or 470, and the controller/processor 459 or 475 configured to perform the functions recited by the aforementioned means.

The present disclosure describes control of UE transmission power level in sidelink discovery processes. In order to reduce interference with base station and/or other UE transmissions that occur geographically proximate to a UE, sidelink power transmissions are controlled based on one or more of downlink pathlosses, sidelink pathlosses, reference sidelink pathloss values, application usage, and/or other factors. UE transmission power levels may also be determined based on the type of message being transmitted. UE transmission levels may also be increased based on one or more factors, depending on the number of responses received, the time it takes to receive a response, and/or other factors.

The following examples are illustrative only and may be combined with aspects of other embodiments or teachings described herein, without limitation.

A method of wireless communication at a first UE for discovery of at least one other UE in accordance with an aspect of the present disclosure comprises determining at least one transmission parameter at the first UE, determining a transmit power level based on the at least one transmission parameter, and transmitting a discovery message at the determined transmit power level on a SL discovery channel.

Such a method further optionally includes the discovery message comprising one of a discovery announcement message or a discovery solicitation message, calculating the transmission power level using the at least one SL transmission parameter, the at least one SL transmission parameter comprising at least one open loop power control (OLPC) parameter associated with the SL discovery message, the at least one OLPC parameter being different from at least one other OLPC parameter associated with SL communication on at least one of a SL control channel or a SL data channel, the at least one OLPC parameter comprising a plurality of sets of OLPC parameters, each of the plurality of sets of OLPC parameters comprising a respective first OLPC discovery parameter and a respective second OLPC discovery parameter, and each of the plurality of sets of OLPC parameters being associated with one of broadcast of the SL discovery message, group cast of the SL discovery message, or unicast of the SL discovery message, the transmission parameter comprising at least one reference SL pathloss value, the at least one reference SL pathloss value being received from a base station, the at least one transmission parameter being determined based on information provided by at least one of an application, a service, or a protocol layer, increasing the transmission power level when a response to the SL discovery message is not received on the SL discovery channel within a first time period and retransmitting the SL discovery message at the increased transmission power level after the first time period, the transmission power level being increased based on at least one of a plurality of reference SL pathloss values, the transmission power level is increased based on a predetermined increment associated with retransmission of the SL discovery message, the SL discovery message comprises a value indicating the transmission power, transmitting at least one reference signal in association with transmitting the SL discovery message, the at least one reference signal comprises at least one of a DMRS, a synchronization signal, or a PSBCH, receiving, in response to the SL discovery message, a response message on the sidelink channel from at least one other UE, the response message is received at a received power level determined based on at least one of the transmission power level, at least one transmission parameter, at least one SL reference signal, or a reference SL pathloss value, the response message is received at an increased power level after a first time period, and the increased power level is determined based on power level is further based on at least one of a plurality of reference SL pathloss values or a predetermined increment associated with the response message.

A method in accordance with an aspect of the present disclosure comprises receiving a discovery message from at least one second UE, determining at least one transmission parameter, determining the transmit power level based on the at least one transmission parameter, and transmitting a discovery message at the determined transmit power level on a SL discovery channel.

Such a method further optionally includes identifying a discovery transmit power level associated with the discovery message, and determining, at least in part, the transmit power level based at least in part on the discovery transmit power level.

An apparatus for wireless communication in accordance with an aspect of the present disclosure comprises a memory and at least one processor coupled to the memory and configured to determine at least one transmission parameter at the first UE, determine a transmit power level based on the at least one transmission parameter, and transmit a discovery message at the determined transmit power level on a SL discovery channel.

Such an apparatus further optionally includes the discovery message comprising one of a discovery announcement message or a discovery solicitation message, the at least one processor being further configured to calculate the transmission power level using the at least one SL transmission parameter, the at least one SL transmission parameter comprising at least one OLPC parameter associated with the SL discovery message, the at least one OLPC parameter being different from at least one other OLPC parameter associated with SL communication on at least one of a SL control channel or a SL data channel, the at least one OLPC parameter comprising a plurality of sets of OLPC parameters, each of the plurality of sets of OLPC parameters comprising a respective first OLPC discovery parameter and a respective second OLPC discovery parameter, and each of the plurality of sets of OLPC parameters being associated with one of broadcast of the SL discovery message, group cast of the SL discovery message, or unicast of the SL discovery message, the transmission parameter comprising at least one reference SL pathloss value, the at least one reference SL pathloss value being received from a base station, the at least one transmission parameter being determined based on information provided by at least one of an application, a service, or a protocol layer, the at least one processor being further configured to increase the transmission power level when a response to the SL discovery message is not received on the SL discovery channel within a first time period and retransmit the SL discovery message at the increased transmission power level after the first time period, the transmission power level being increased based on at least one of a plurality of reference SL pathloss values, the transmission power level being increased based on a predetermined increment associated with retransmission of the SL discovery message, the SL discovery message comprising a value indicating the transmission power, the at least one processor being further configured to transmit at least one reference signal in association with transmitting the SL discovery message, the at least one reference signal comprising at least one of a DMRS, a synchronization signal, or a PSBCH, the at least one processor being further configured to receive, in response to the SL discovery message, a response message on the sidelink channel from at least one other UE, the response message being received at a received power level determined based on at least one of the transmission power level, at least one transmission parameter, at least one SL reference signal, or a reference SL pathloss value, the response message being received at an increased power level after a first time period, and the increased power level being determined based on at least one of a plurality of reference SL pathloss values or a predetermined increment associated with the response message.

An apparatus for wireless communication in accordance with an aspect of the present disclosure comprises means for determining at least one transmission parameter at the first UE, means for determining a transmit power level based on the at least one transmission parameter, and means for transmitting a discovery message at the determined transmit power level on a SL discovery channel.

Such an apparatus further optionally includes the discovery message comprising one of a discovery announcement message or a discovery solicitation message, means for calculating the transmission power level using the at least one SL transmission parameter, the at least one SL transmission parameter comprising at least one OLPC parameter associated with the SL discovery message, the at least one OLPC parameter being different from at least one other OLPC parameter associated with SL communication on at least one of a SL control channel or a SL data channel, the at least one OLPC parameter comprising a plurality of sets of OLPC parameters, each of the plurality of sets of OLPC parameters comprising a respective first OLPC discovery parameter and a respective second OLPC discovery parameter, and each of the plurality of sets of OLPC parameters being associated with one of broadcast of the SL discovery message, group cast of the SL discovery message, or unicast of the SL discovery message, the transmission parameter comprising at least one reference SL pathloss value, the at least one reference SL pathloss value being received from a base station, the at least one transmission parameter being determined based on information provided by at least one of an application, a service, or a protocol layer, means for increasing the transmission power level when a response to the SL discovery message is not received on the SL discovery channel within a first time period and means for retransmitting the SL discovery message at the increased transmission power level after the first time period, the transmission power level being increased based on at least one of a plurality of reference SL pathloss values, the transmission power level being increased based on a predetermined increment associated with retransmission of the SL discovery message, the SL discovery message comprising a value indicating the transmission power, means for transmitting at least one reference signal in association with transmitting the SL discovery message, the at least one reference signal comprising at least one of a DMRS a synchronization signal, or a PSBCH, means for receiving, in response to the SL discovery message, a response message on the sidelink channel from at least one other UE, the response message being received at a received power level determined based on at least one of the transmission power level, at least one transmission parameter, at least one SL reference signal, or a reference SL pathloss value, the response message being received at an increased power level after a first time period, and the increased power level being determined based on at least one of a plurality of reference SL pathloss values or a predetermined increment associated with the response message.

A computer-readable medium that stores computer executable code, the code, when executed by a processor in accordance with an aspect of the present disclosure comprises causing the processor to determine at least one transmission parameter at the first UE, determine a transmit power level based on the at least one transmission parameter, and transmit a discovery message at the determined transmit power level on a SL discovery channel.

Example 1 of the present disclosure may be a UE configured to determine at least one transmission parameter associated with a discovery message at the first UE, determine a transmit power level based on the at least one transmission parameter, and transmit the discovery message at the determined transmit power level on a SL discovery channel.

Example 2 may include the UE of Example 1, and the UE may be further configured to transmit the discovery message in a SL discovery channel.

Example 3 may include the UE of Example 1, and the UE may be further configured to transmit the discovery message in a discovery resource pool.

Example 4 may include the UE of Example 1, and the UE may be further configured to transmit a discovery message comprising one of a discovery announcement message or a discovery solicitation message.

Example 5 may include the UE of Examples 1 through 4, and the UE may be further configured to calculate the transmission power level using at least one SL transmission parameter.

Example 6 may include the UE of Example 5, and the UE may be further configured to calculate the at least one SL transmission parameter to include at least one OLPC parameter associated with the SL discovery message, where the at least one OLPC parameter is different from at least one other OLPC parameter associated with SL communication on at least one of a SL control channel or a SL data channel.

Example 7 may include the UE of Example 5, and the UE may be further configured to calculate the at least one SL transmission parameter using at least one of a plurality of sets of OLPC parameters, each of the plurality of sets of OLPC parameters comprising a respective first OLPC discovery parameter and a respective second OLPC discovery parameter, and each of the plurality of sets of OLPC parameters being associated with one of broadcast of the SL discovery message, group cast of the SL discovery message, or unicast of the SL discovery message.

Example 8 may include the UE of Example 1, and the UE may be further configured to determine at least one transmission parameter including at least one reference SL pathloss value.

Example 9 may include the UE of Example 8, and the UE may be further configured to determine at least one transmission parameter based on the at least one reference SL pathloss value being received from a base station.

Example 10 may include the UE of Example 8, and the UE may be further configured to determine at least one transmission parameter based on the at least one reference SL pathloss value being received from a base station.

Example 11 may include the UE of Example 1, and the UE may be further configured to determine at least one transmission parameter based on information provided by at least one of an application, a service, or a protocol layer.

Example 12 may include the UE of Example 1, and the UE may be further configured to increase the transmission power level when a response to the SL discovery message is not received on the SL discovery channel within a first time period, and the UE may be further configured to retransmit the SL discovery message at the increased transmission power level after the first time period.

Example 13 may include the UE of Example 12, and the UE may be further configured to increase the transmission power level based on at least one of a plurality of reference SL pathloss values.

Example 14 may include the UE of Example 12, and the UE may be further configured to increase the transmission power level based on a predetermined increment associated with retransmission of the SL discovery message.

Example 15 may include the UE of Example 1, and the UE may be further configured to transmit the SL discovery message including a value indicating the transmission power.

Example 16 may include the UE of Example 1, and the UE may be further configured to transmit at least one reference signal in association with transmitting the SL discovery message.

Example 17 may include the UE of Example 16, and the UE may be further configured to transmit at least one reference signal comprising at least one of a DMRS or a SRS. a synchronization signal, or a physical sidelink broadcast channel (PSBCH)

Example 18 may include the UE of Example 1, and the UE may be further configured to receive, in response to the SL discovery message, a response message on the sidelink channel from at least one other UE.

Example 19 may include the UE of Example 18, and the UE may be further configured to receive the response message at a received power level determined based on at least one of the transmission power level, at least one transmission parameter, at least one SL reference signal, or a reference SL pathloss value.

Example 20 may include the UE of Example 19, and the UE may be further configured to receive at an increased power level after a first time period.

Example 21 may include the UE of Example 20, and the UE may be further configured to transmit at the increased power level, where the increased power level is determined based on at least one of a plurality of reference SL pathloss values or a predetermined increment associated with the response message.

Example 22 of the present disclosure may be a UE configured to receive a first discovery message from at least one second UE, determine at least one transmission parameter of the first discovery message at the first UE, determine a transmit power level based on the at least one transmission parameter, and transmit a second discovery message at the determined transmit power level on a SL channel.

Example 23 may include the UE of Example 22, and the UE may be further configured to transmit the second discovery message comprising a connection establishment request message.

Example 24 may include the UE of Example 22, and the UE may be further configured to transmit the second discovery message comprising a discovery announcement message or a discovery solicitation message.

Example 25 may include the UE of Example 22, and the UE may be further configured to identify a discovery transmit power level associated with the discovery message.

Example 26 may include the UE of Example 25, and the UE may be further configured to determine, at least in part, the transmit power level based at least in part on the discovery transmit power level.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first user equipment (UE) for discovery of at least one other UE, the apparatus comprising:
   at least one processor;
   a transceiver; and
   a memory, coupled to the at least one processor and the transceiver, storing instructions, which when executed by the at least one processor, cause the apparatus to:
      determine at least one sidelink (SL) transmission parameter associated with a SL discovery message at the first UE;
      determine a transmission power level based on the at least one SL transmission parameter;
      transmit, via the transceiver, the SL discovery message at the determined transmission power level on a SL channel; and
      receive, in response to the SL discovery message, via the transceiver, a response message on the SL channel from a second UE, wherein the SL discovery message and the response message are configured with different SL transmission parameters within a same resource pool.

2. The apparatus of claim 1, wherein the SL channel is a SL discovery channel.

3. The apparatus of claim 1, wherein the discovery message is transmitted in a discovery resource pool.

4. The apparatus of claim 1, wherein the SL discovery message comprises one of a discovery announcement message or a discovery solicitation message.

5. The apparatus of claim 1, wherein the instructions, which when executed by the at least one processor, further cause the apparatus to:
   calculate the transmission power level using the at least one SL transmission parameter, the at least one SL transmission parameter comprising at least one open loop power control (OLPC) parameter associated with the SL discovery message.

6. The apparatus of claim 5, wherein the at least one OLPC parameter is different from at least one other OLPC parameter associated with SL communication on at least one of a SL control channel or a SL data channel.

7. The apparatus of claim 6, wherein the at least one OLPC parameter comprises a plurality of sets of OLPC parameters, each of the plurality of sets of OLPC parameters comprising a respective first OLPC discovery parameter and a respective second OLPC discovery parameter, and each of the plurality of sets of OLPC parameters being associated with one of broadcast of the SL discovery message, group cast of the SL discovery message, or unicast of the SL discovery message.

8. The apparatus of claim 1, wherein the at least one SL transmission parameter comprises at least one reference SL pathloss value.

9. The apparatus of claim 8, wherein the at least one reference SL pathloss value is received from a base station.

10. The apparatus of claim 8, wherein the at least one reference SL pathloss value is preconfigured in the UE.

11. The apparatus of claim 1, wherein the at least one SL transmission parameter is determined based on information provided by at least one of an application, a service, or a protocol layer.

12. The apparatus of claim 1, wherein the instructions, which when executed by the at least one processor, further cause the apparatus to:
   increase the transmission power level when a response to the SL discovery message is not received within a first time period; and
   retransmit, via the transceiver, the SL discovery message at the increased transmission power level after the first time period.

13. The apparatus of claim 12, wherein the transmission power level is increased based on at least one of a plurality of reference SL pathloss values.

14. The apparatus of claim 12, wherein the transmission power level is increased based on a predetermined increment associated with retransmission of the SL discovery message.

15. The apparatus of claim 1, wherein the SL discovery message comprises a value indicating the transmission power level.

16. The apparatus of claim 1, wherein the instructions, which when executed by the at least one processor, further cause the apparatus to:
   transmit, via the transceiver, at least one reference signal in association with transmitting the SL discovery message.

17. The apparatus of claim 16, wherein the at least one reference signal comprises at least one of a demodulation reference signal (DMRS), a synchronization signal, or a physical sidelink broadcast channel (PSBCH).

18. The apparatus of claim 1, wherein the response message is received at a received power level determined based on at least one of the transmission power level, at least one SL transmission parameter, at least one SL reference signal, or a reference SL pathloss value.

19. The apparatus of claim 18, wherein the response message is received at an increased power level after a first time period.

20. The apparatus of claim 19, wherein the increased power level is determined based on at least one of a plurality of reference SL pathloss values or a predetermined increment associated with the response message.

21. A method of wireless communication at a first user equipment (UE) for discovery of at least one other UE, the method comprising:
   determining at least one sidelink (SL) transmission parameter associated with a SL discovery message at the first UE;
   determining a transmission power level based on the at least one SL transmission parameter;
   transmitting the SL discovery message at the determined transmission power level on a SL channel; and
   receiving, in response to the SL discovery message, a response message on the SL channel from a second UE, wherein the SL discovery message and the response message are configured with different SL transmission parameters within a same resource pool.

22. The method of claim 21, further comprising:
calculating the transmit power level using the at least one SL transmission parameter, the at least one SL transmission parameter comprising at least one open loop power control (OLPC) parameter associated with the SL discovery message, and
wherein the at least one OLPC parameter is different from at least one other OLPC parameter associated with SL communication on at least one of a SL control channel or a SL data channel,
wherein the at least one OLPC parameter comprises a plurality of sets of OLPC parameters, each of the plurality of sets of OLPC parameters comprising a respective first OLPC discovery parameter and a respective second OLPC discovery parameter, and each of the plurality of sets of OLPC parameters being associated with one of broadcast of the SL discovery message, group cast of the SL discovery message, or unicast of the SL discovery message.

23. An apparatus for wireless communication at a first user equipment (UE) for response to at least one second UE, the apparatus comprising:
at least one processor;
a transceiver; and
a memory, coupled to the at least one processor and the transceiver, storing instructions, which when executed by the at least one processor, cause the apparatus to:
receive, at the first UE, via the transceiver, a first discovery message from the at least one second UE;
determine at least one sidelink (SL) transmission parameter of the first discovery message at the first UE;
determine a transmit power level based on the at least one SL transmission parameter;
transmit, from the first UE, via the transceiver, a second discovery message at the determined transmit power level on a SL channel; and
receive, in response to the second discovery message, via the transceiver, a response message on the SL channel from a second UE, wherein the second discovery message and the response message are configured with different SL transmission parameters within a same resource pool.

24. The apparatus of claim 23, wherein the first discovery message comprises a connection establishment request message.

25. The apparatus of claim 23, wherein the first discovery message comprises a discovery announcement message or a discovery solicitation message.

26. The apparatus of claim 23, wherein determining the at least one SL transmission parameter further comprises to identify a discovery transmit power level associated with the first discovery message.

27. The apparatus of claim 26, wherein determining the transmit power level further comprises to determine, at least in part, the transmit power level based at least in part on the discovery transmit power level.

28. A method of wireless communication at a first user equipment (UE) for response to at least one second UE, comprising:
receiving, at the first UE, a first discovery message from the at least one second UE;
determining at least one sidelink (SL) transmission parameter of the first discovery message at the first UE;
determining a transmit power level based on the at least one SL transmission parameter;
transmitting, from the first UE, a second discovery message at the determined transmit power level on a SL channel; and
receiving, in response to the second discovery message, a response message on the SL channel from the at least one second UE, wherein the second discovery message and the response message are configured with different SL transmission parameters within a same resource pool.

29. The method of claim 28, wherein:
the determining the at least one SL transmission parameter further comprises identifying a discovery transmit power level associated with the first discovery message, and
the determining the transmit power level further comprises determining, at least in part, the transmit power level based at least in part on the discovery transmit power level.

* * * * *